US006352174B1

(12) United States Patent
Bauman et al.

(10) Patent No.: US 6,352,174 B1
(45) Date of Patent: Mar. 5, 2002

(54) CARTON DISPENSING MACHINE

(75) Inventors: Edward Frederick Bauman, Waterloo; Barry B. Bauman, Kitchener, both of (CA)

(73) Assignee: Nature-Pac Inc., Waterloo (CA)

( * ) Notice: Subject to any disclaimer, the term of this patent is extended or adjusted under 35 U.S.C. 154(b) by 20 days.

(21) Appl. No.: 09/594,142

(22) Filed: Jun. 15, 2000

Related U.S. Application Data

(63) Continuation-in-part of application No. 09/127,718, filed on Aug. 3, 1998, now Pat. No. 6,149,031.

(60) Provisional application No. 60/056,401, filed on Aug. 26, 1997.

(51) Int. Cl.[7] ................................................ B65G 59/00

(52) U.S. Cl. ....................... 221/109; 221/107; 221/225; 221/237; 221/130; 221/131

(58) Field of Search ................................ 221/103, 107, 221/108, 109, 110, 111, 131, 134, 194, 195, 225, 237, 266, 130

(56) References Cited

U.S. PATENT DOCUMENTS 2,002,753 A * 5/1935 Parks et al. ................. 221/109
2,376,960 A * 5/1945 Clem ......................... 221/266
2,562,015 A * 7/1951 Cattarach .................... 221/109
2,570,516 A * 10/1951 Bowman .................... 221/109
2,719,651 A * 10/1955 Gabrielsen .................. 221/130
4,232,800 A * 11/1980 Martin et al. ............... 221/109
4,986,441 A * 1/1991 Kanbe et al. ............... 221/131
6,149,031 A * 11/2000 Bauman et al. ............. 221/109

FOREIGN PATENT DOCUMENTS

DE 1805800 * 6/1970 ................. 221/111

* cited by examiner

*Primary Examiner*—H. Grant Skaggs
(74) *Attorney, Agent, or Firm*—Daryl W. Schnurr

(57) ABSTRACT

A dispensing machine is used to dispense rectangularly shaped containers including milk cartons and the like, preferably of a size ranging from approximately one-half liter to approximately two liters or even larger. The machine can be used to dispense various products including juices, soft drinks, milk, candy and virtually any product that can be suitably contained in a square rectangular container. The machine has a vertical channel containing paddles where each paddle supports only some of the containers in the channel when the channel is filled with containers. Since the containers have flexible side walls, the paddles move simultaneously to gently lower the containers one space at a time when the machine is activated. Also, when the containers are in the vertical channel, the lowermost container is not subjected to the weight of all of the containers above it when the channel is filled with containers. This arrangement prevents containers in the vertical channel from being crushed by containers located above it. In a further embodiment, a dispensing machine has three sets of shelves, each set having a vertical channel with control means so that three different types of products can be dispensed from one machine.

22 Claims, 8 Drawing Sheets

CARTON DISPENSING MACHINE

This invention is a continuation in part application to application Ser. No. 09/127,718 as filed on Aug. 3, 1998, and now U.S. Pat. No. 6,149,031 which is incorporated by reference in this application.

BACKGROUND OF THE INVENTION

1. Field of Invention

This invention relates to a dispensing machine for dispensing rectangularly shaped containers with flexible side walls, said containers including milk cartons.

2. Description of the Prior Art

It has been desirable to dispense milk contained in milk cartons from vending machines for some time. The cartons have flexible side walls and are easily damaged. Milk cartons tend to have a much greater strength longitudinally than they do laterally. When a milk carton is lying on its side and is subjected to pressure from other milk cartons placed on top of it, the milk carton at the bottom can be seriously damaged. Further, if a milk carton falls through the air, it could also be subjected to serious damage upon landing. Still-further, consumers will not accept milk contained in a milk carton that has been damaged in some way even if the carton does not leak. In the parent application, applicant created a dispensing machine that will dispense fragile cylindrically shaped containers containing soft drinks and the like. However, those previous machines would not dispense rectangularly shaped containers and would not dispense milk cartons. Further, those machines described in the parent application can only dispense one type of beverage.

Further, large milk cartons of a size of approximately two liters or two quarts are much more difficult to dispense than smaller milk cartons. The fact that milk cartons cannot be properly dispensed through dispensing machines has increased the selling price of milk as it is more expensive to sell milk over the counter than it is to sell it through a vending machine. Small milk cartons of a size of approximately a ¼ litre or less can be dispensed from conventional dispensing machines because the side walls are very short and are therefore relatively strong and rigid compared to larger milk cartons

SUMMARY OF THE INVENTION

It is an object of the present invention to provide a dispensing machine that will dispense rectangularly shaped containers with flexible side walls such as milk cartons and the like. The machine will also dispense various goods that are contained in rectangularly shaped containers that are similar to milk cartons. For example, juices, soft drinks, flavoured beverages, water and candy or any product that will fit within a rectangularly shaped carton can be dispensed using the machine of the present invention.

A dispensing machine for dispensing rectangularly shaped containers with flexible side walls has a housing with an outlet for the containers. The housing contains a plurality of shelves that are sloped toward a vertical channel and the shelves are constructed so that the containers will slide laterally along the shelves on one side toward the channel. The channel extends from below a lowermost shelf past an uppermost shelf and the channel provides an exit passage for containers from the shelves to the outlet. The channel contains a plurality of paddles spaced vertically apart from one another. Each paddle is capable of supporting a limited number of containers within the channel. The paddles are arranged to move simultaneously to lower one container (for each paddle) at a time from a space in the channel immediately above each paddle to a space in the channel immediately below each paddle. Each shelf has a first gate located at a lower end thereof to control entry of containers from that shelf to the vertical channel. There is no shelf immediately opposite each paddle. Each first gate has L-shaped guide means on a side thereof facing the vertical channel. Those gates of the first gates that are located immediately adjacent to the paddles are offset inwardly toward the shelves to provide greater width to the channel. Barriers are located in the vertical channel and there is one barrier at each access area where a shelf has been omitted to prevent a container in the vertical channel from exiting the channel prematurely through the access area. There are activation means accessible from outside the housing to cause paddles to move simultaneously thereby moving all containers within the channel downward one space at a time and moving a lowermost container to the outlet.

In a further embodiment of the dispensing machine of the present invention, the barriers located immediately adjacent to the paddles are not offset toward the shelves, but are bent inward giving each barrier a V-shaped cross section to provide greater room in the vertical channel for the containers to move past each paddle.

A dispensing machine for dispensing containers with flexible side walls has a housing with an outlet for the containers. The housing contains two sets of shelves, each set of shelves having a corresponding vertical channel. The shelves of each set are sloped toward the corresponding vertical channel and the shelves are constructed so that the containers will move along the shelves towards said corresponding vertical channel. The channel for each set of shelves extends from a lowermost shelf past an uppermost shelf, the channel providing an exit passage for containers from shelves of one set to the outlet. Each corresponding channel contains a plurality of paddles spaced vertically apart from one another. Each paddle is capable of supporting a limited number of containers within the corresponding channel. The paddles in each vertical channel are arranged to move simultaneously to lower one container, for each paddle, at a time from a space in the channel immediately above each paddle to a space in the channel immediately below each paddle. The paddles in each vertical channel move independently of the paddles in any other vertical channel. Each shelf has a first gate located at a lower end thereof to control entry of containers from that shelf to the corresponding vertical channel. There is no shelf immediately opposite each paddle. Each first gate has guide means on a side thereof facing the vertical channel. Barriers are located in each corresponding vertical channel, one barrier being located at each access area where a shelf has been omitted to prevent a container in the vertical channel from exiting the channel prematurely through the access area. There is a controller and activation means accessible from outside the housing to allow paddles in each vertical channel to be activated independently of paddles in any other vertical channel, thereby moving all containers within that vertical channel that is activated downward one space at a time and moving a lowermost container in the vertical channel that is activated to the outlet.

DESCRIPTION OF A PREFERRED EMBODIMENT

Figure 1:
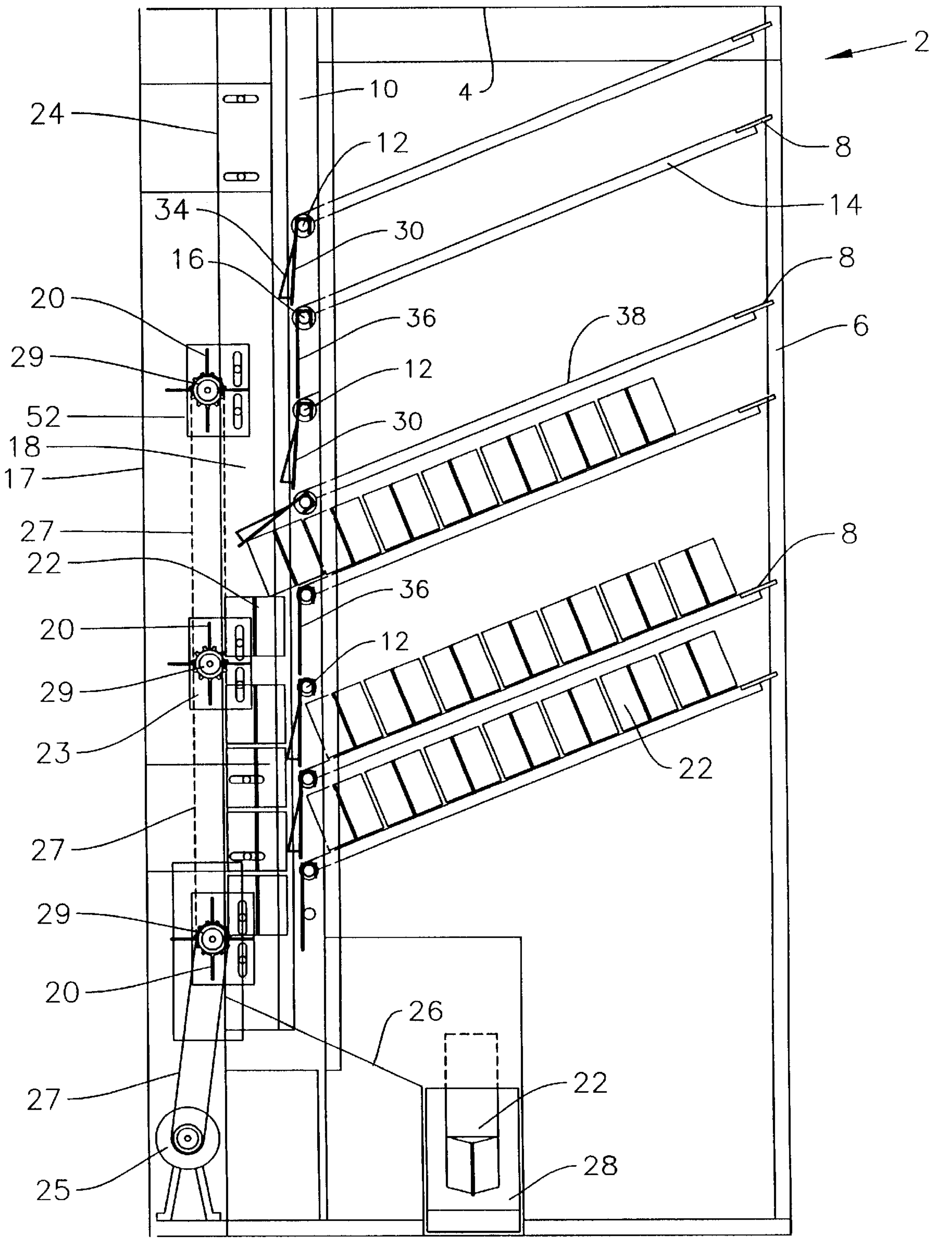
FIG. 1 is a side view of an interior of a dispensing machine in accordance with the present invention with barriers offset adjacent to the paddles.
Figure 2:
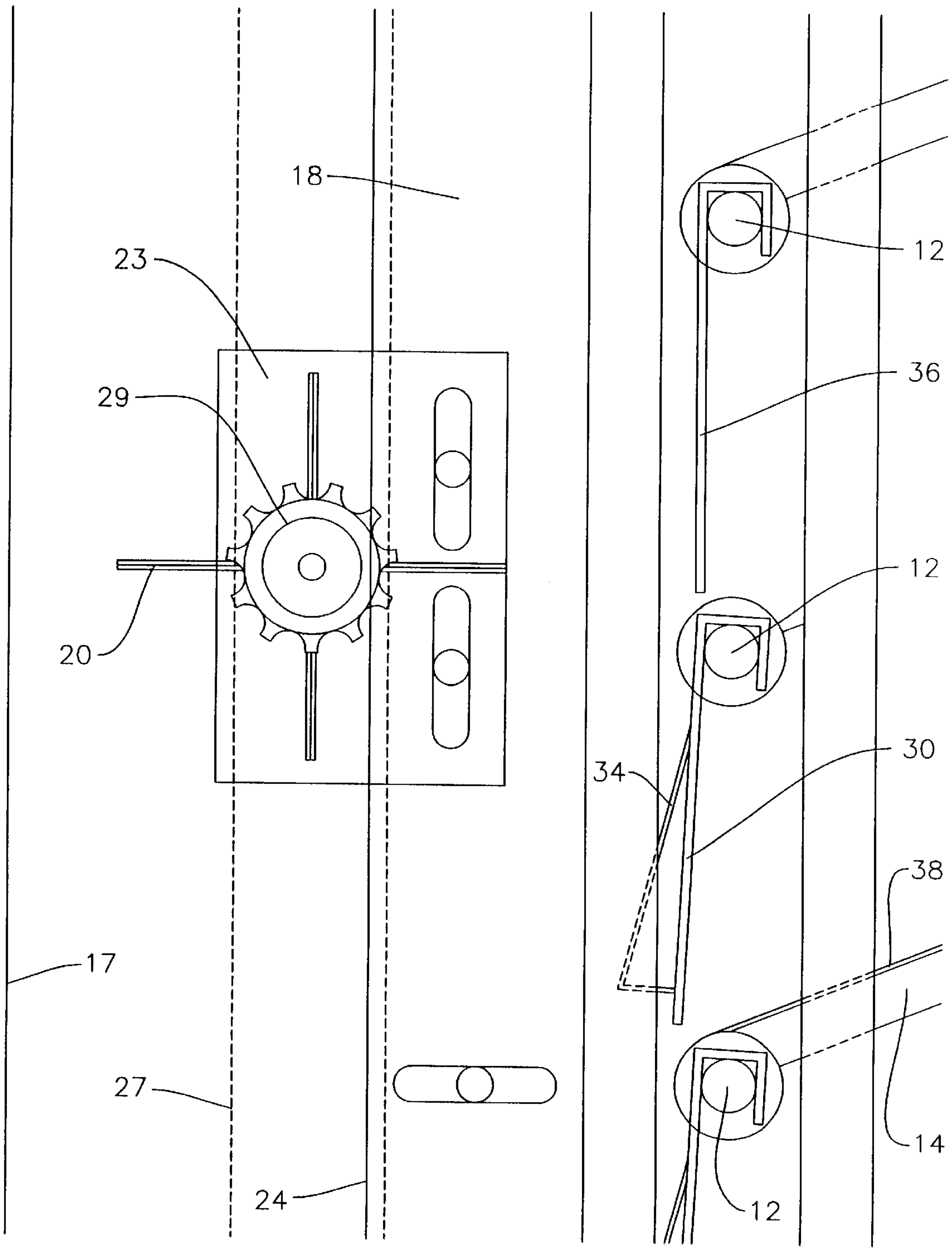
FIG. 2 is an enlarged side view of part of a vertical channel.

In the drawings, in FIGS. 1 and 2, a vending machine 2 has a housing 4 with one vertical support 6. The support 6 has clips 8. The vertical support 6 is preferably centrally mounted on an outside wall of the housing 4. Two additional vertical supports 10 (only one of which is shown) are spaced apart from one another. Support rods 12 extend horizontally between the supports 10. A plurality of shelves 14 slope downward from the clips 8 to the rods 12, which are located at a lower end 16 of the shelves 14. The shelves 14 have sufficient slope so that rectangular containers will slide along the shelves toward the lower end where each container can be successively removed from the shelf. There are six shelves 14 shown in FIG. 1. Obviously, a larger housing will accommodate more shelves or longer shelves and shelves can be spaced closer together or further apart depending on the size of the containers being dispensed. The shelves have a steeper slope than the shelves of parent application Ser. No. 09/127,718.

Along a side 17 of the housing 4, there is located a vertical channel 18. The vertical channel 18 contains three paddles 20 that are spaced vertically apart from one another. The lowermost paddle is located slightly below the lowermost shelf. The paddles 20 are mounted so that they are rotatable about their longitudinal axis. Rectangular containers 22, preferably milk cartons, or other rectangular containers with flexible sides are located on the shelves and partially fill the vertical channel 18. The containers are spaced apart from one another for ease of illustration. The upper three shelves 14 are empty and the third shelf from the bottom only has one container entering the vertical channel. When the machine is completely filled, all of the shelves are filled and the vertical channel will also be filled. A guide wall 24 is located in the channel 18 to maintain the containers 22 within the channel vertically above one another. The guide wall 24 has suitable openings (not shown in FIG. 1) therein to allow the paddles 20 to rotate about their longitudinal axis. The is paddles 20 are rotatably supported by small brackets 23 and a drive means 25. The paddles are interconnected to the drive means 25 by chains or belts 27 on sprockets 29 so that all of the paddles 20 rotate simultaneously. Beneath the channel 18 is a ramp 26 that is sloped in an opposite direction to the shelves 14 to an outlet 28. Containers 22 exiting the vertical channel beneath the lowermost paddle 20 will slide along the ramp 26 to the outlet 28.

It will be noted that immediately adjacent to the uppermost paddle 20 and the middle paddle 20 the shelves 14 have been omitted. It will also be noticed that each of the shelves commencing from the second shelf from the top downward has a first gate 30 located at an end thereof. Each of the first gates 30 is mounted to pivot about the rod 12 located immediately above each shelf. The two rods 12 that are located immediately adjacent to the uppermost and middle paddles 20 are offset inward towards the shelves from the remaining rods 12 to create greater width of the vertical channel. The additional width to the vertical channel is required as the containers on each paddle rotate 45 degrees as the containers are passed downward to a space immediately beneath each paddle. The first gates have L-shaped guide means 34 affixed thereto on a side facing the vertical channel. The guide means 34 forces the containers toward the guide wall 24 as the containers move down the channel 18. The two shelves 14 located immediately above the uppermost and middle paddles 20 contain barriers 36 that do not open up and do not contain guide means. The barriers 36 prevent containers from prematurely exiting the vertical channel 18 into an area of the shelves 14 through an access area closed off by the barriers. Preferably, an upper surface 38 of each shelf 14 is coated with Teflon or has a Teflon surface affixed thereto so that the containers slide easily along the shelves 14. The containers slide laterally along the shelves.

Figure 3:
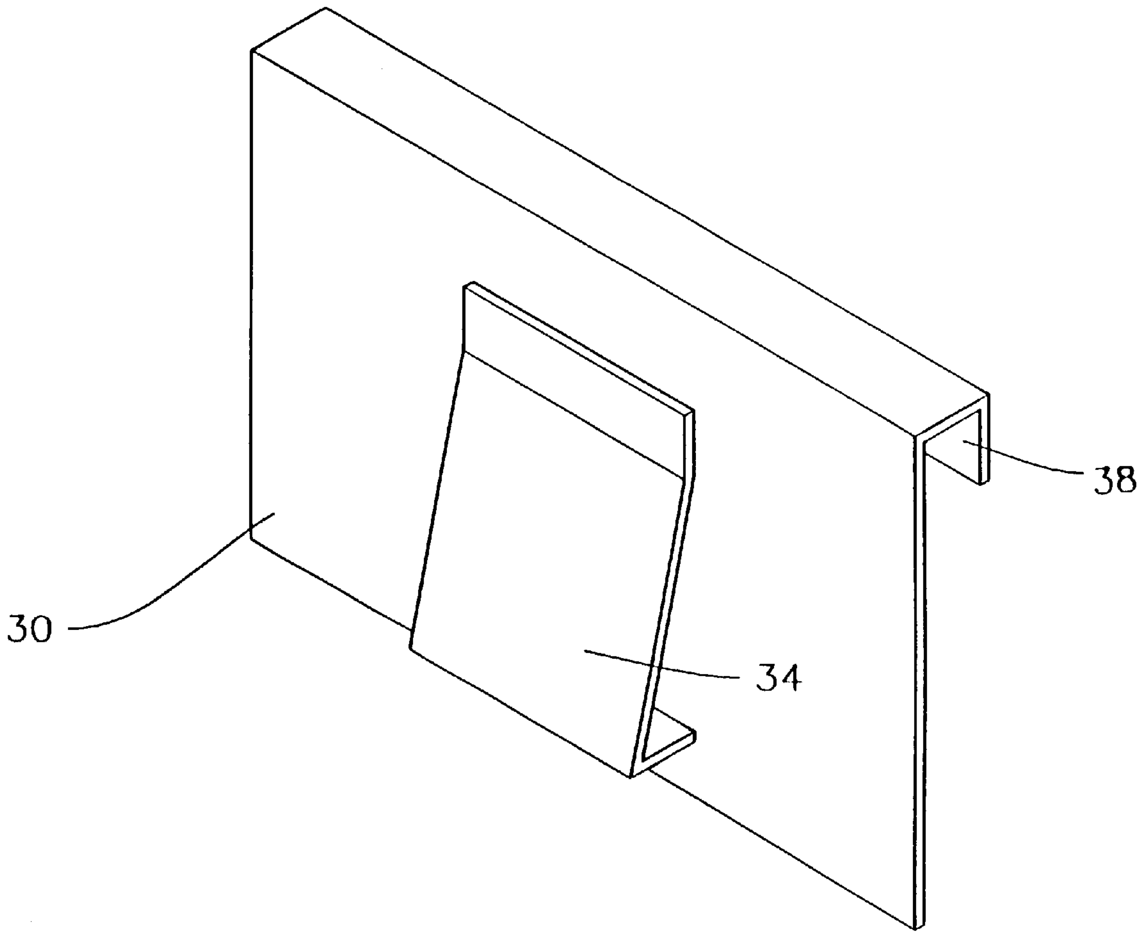
FIG. 3 is a perspective view of a first gate.
Figure 4:
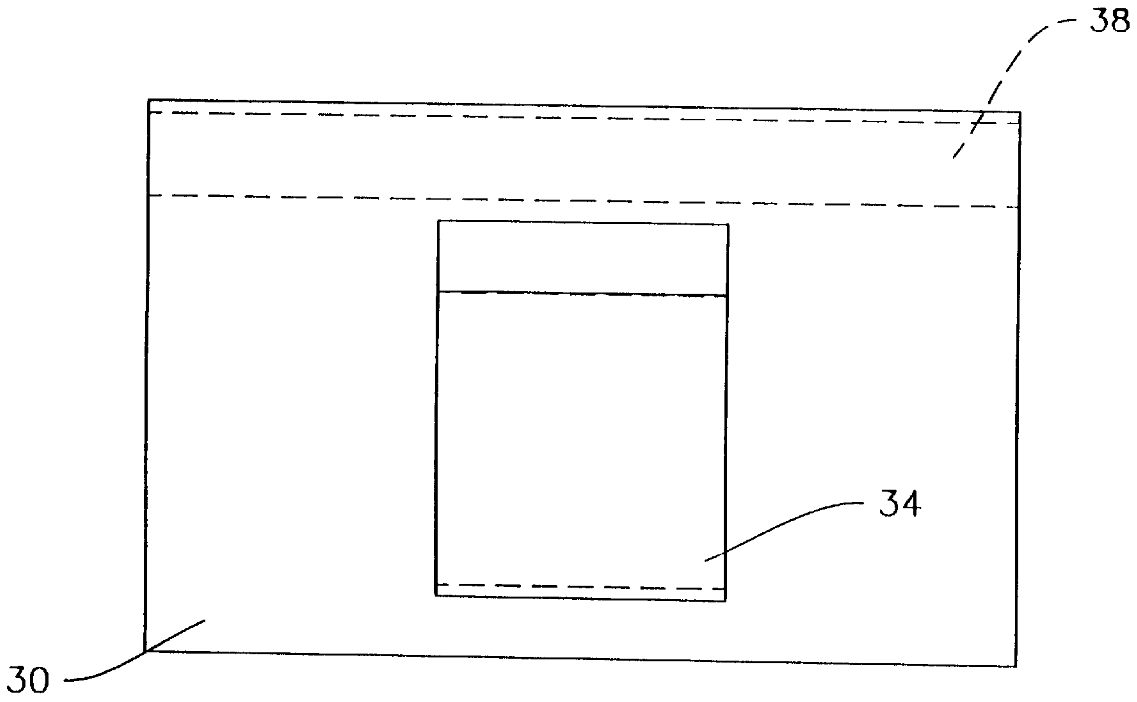
FIG. 4 is a view from the vertical channel of a first gate.

FIGS. 3 and 4 are a perspective view and a side view respectively of a first gate 30 having guide means 34 on an outer surface thereof. A U-shaped flange 38 is formed along a top of the first gate 30. The U-shaped flange rests on the rod 12 (not shown) so that the first gate will swing freely outward to allow a container 22 on the shelf immediately inside of the first gate to exit from the shelf into the vertical channel when there is no container outside of the gate immediately adjacent to that first gate to prevent the first gate from opening.

Figure 5:
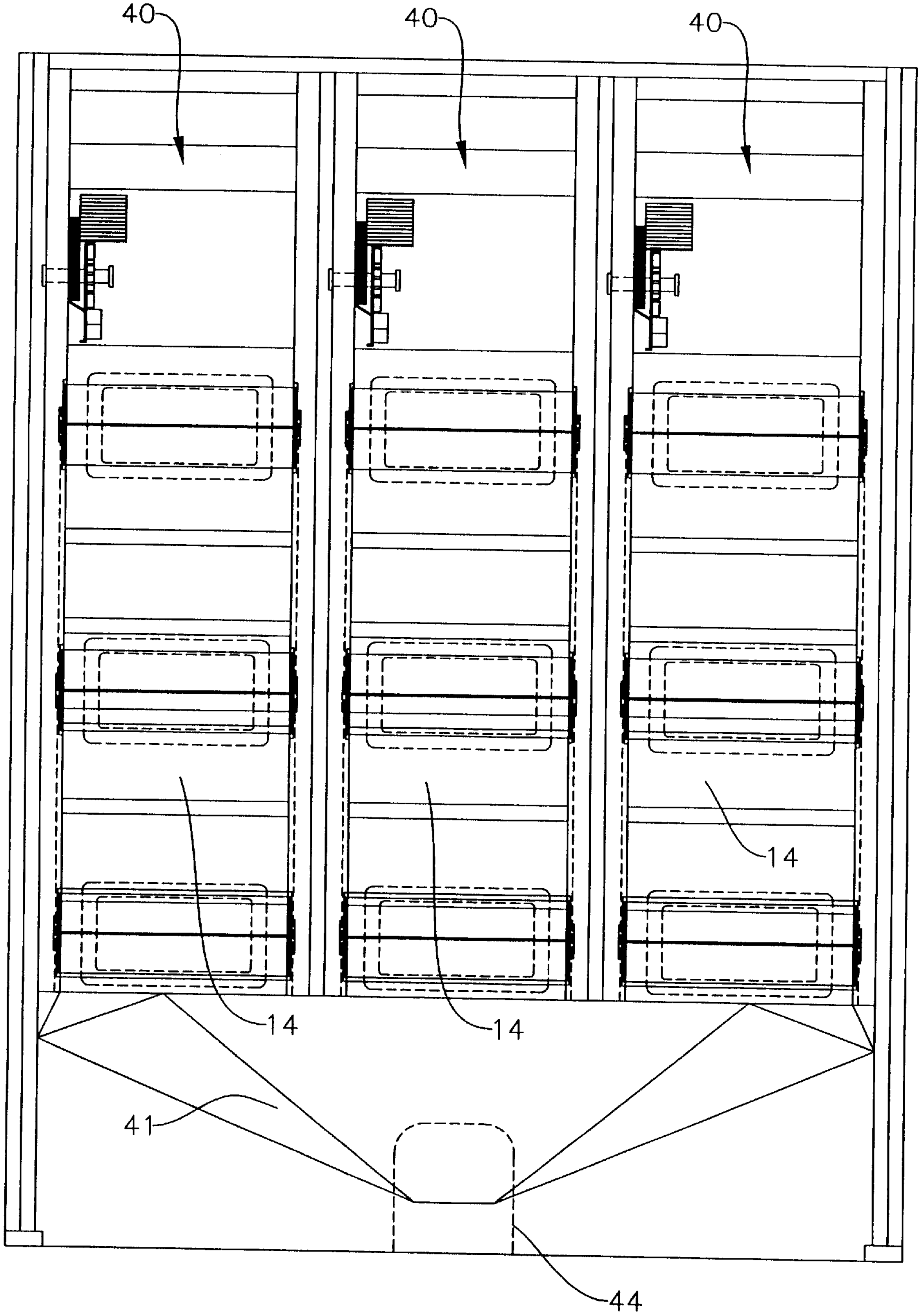
FIG. 5 is a front view of a dispensing machine having three sets of shelves located adjacent to one another.
Figure 6:
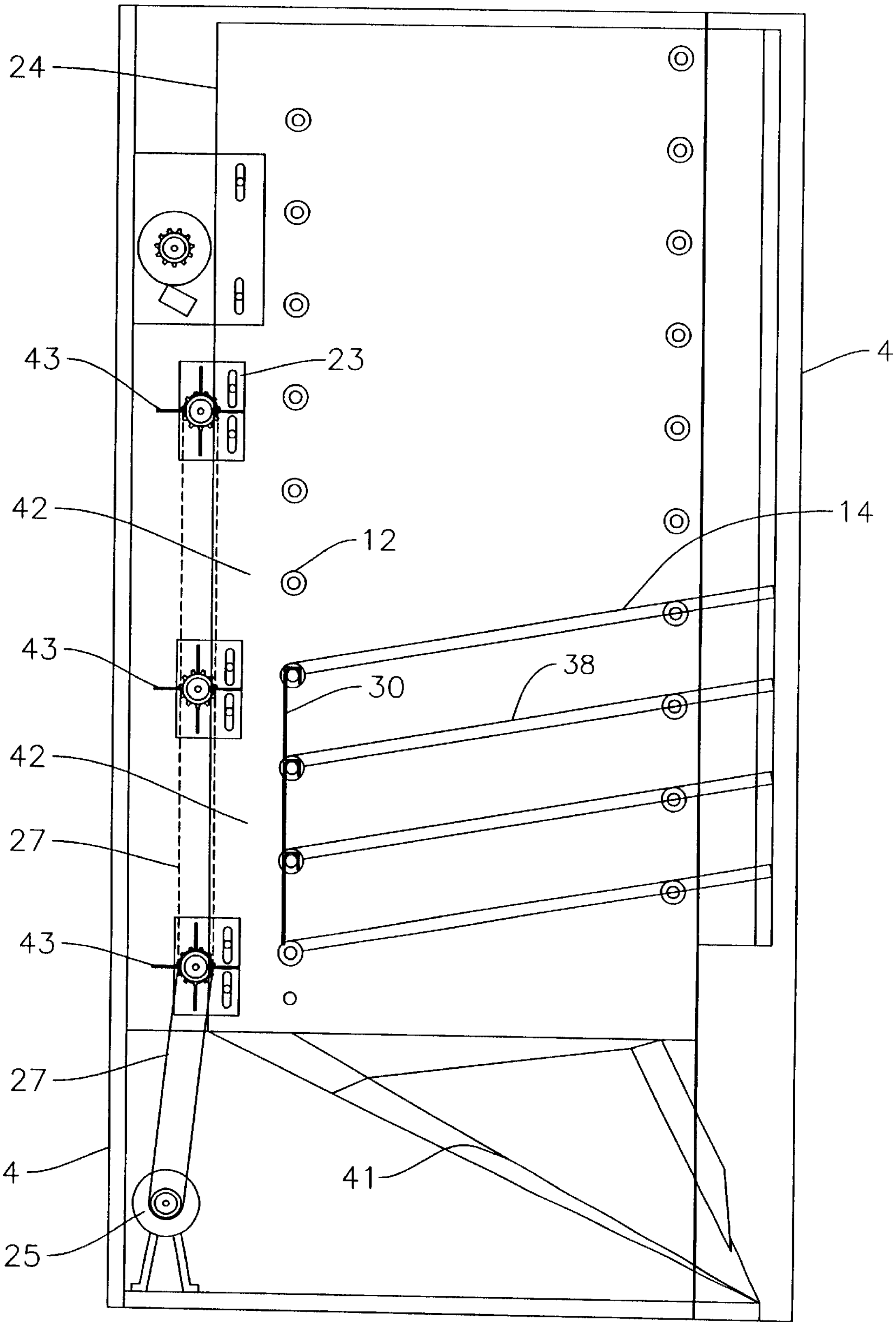
FIG. 6 is a side view of the dispensing machine of FIG. 6 showing one set of shelves only.

In FIG. 5, there is shown a front view of a housing 8 containing three identical sets 40 of sloped shelves 14 with a chute 41 located beneath the shelves and extending to an opening 44. Each set 40 of shelves has one vertical channel 42 and three paddles 43 arranged as shown in FIG. 6. The same reference numerals are used in FIG. 6 to describe those components that are identical to the components of FIGS. 1 and 2. The purpose of having the three sets of shelves is to allow three different beverages to be dispensed from one vending machine. For example, if the containers were milk cartons and milk was being dispensed, one set of shelves could contain milk with one percent fat content, another set of shelves could contain milk cartons with two percent fat content and a third set of shelves could contain milk cartons with chocolate milk.

When milk is being dispensed from the machine, the machine will contain refrigeration means to keep the milk at a desired temperature. The refrigeration means has not been described as it is conventional in vending machines. Refrigeration means or heating means can be used with any product that is being dispensed, as desired. Further, the access door of the dispensing machine has been omitted as this component is also conventional. The motor or power source is shown in only some of the views. Further, the housing 4 is preferably located within a conventional outer shell that is not shown.

Figure 7:
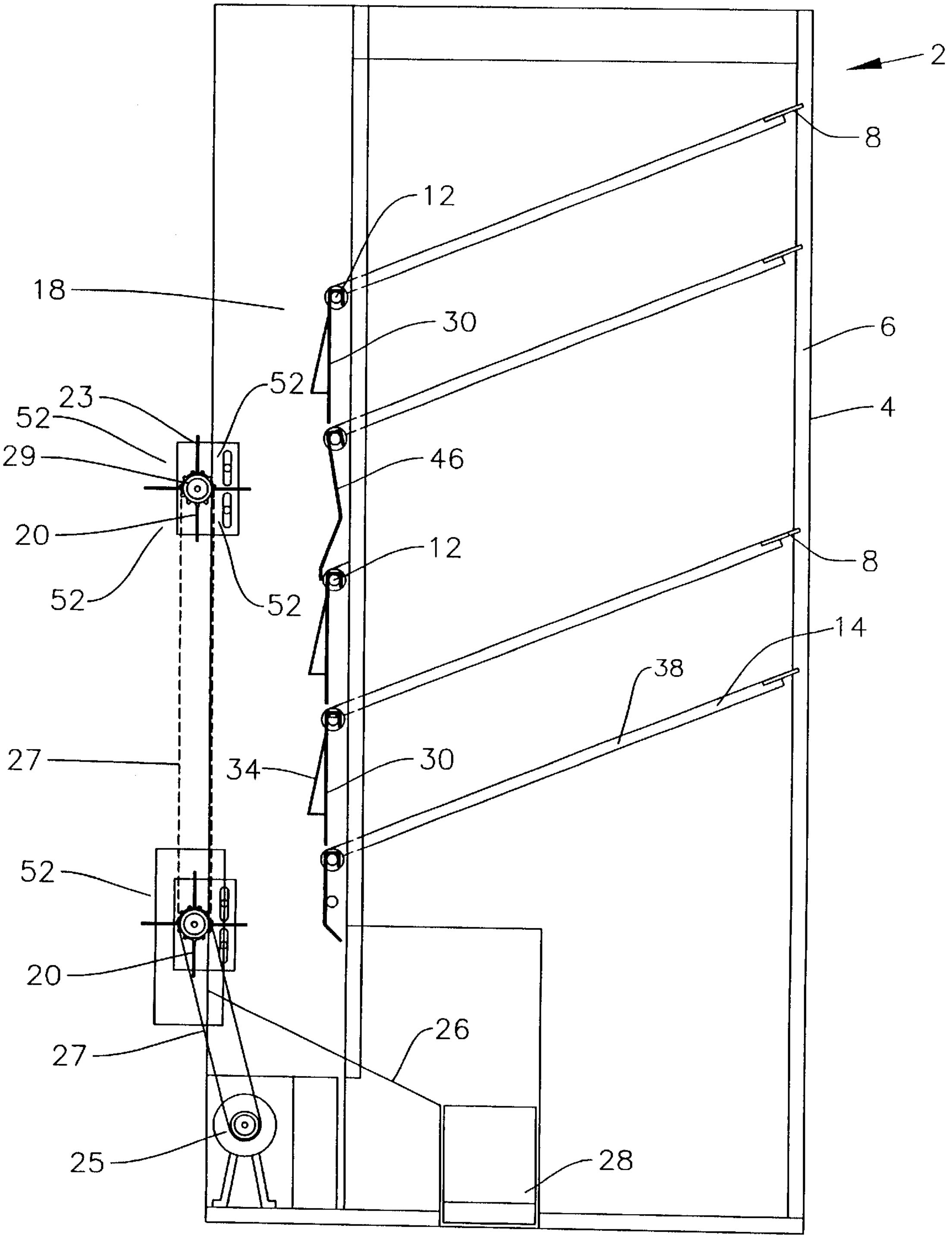
FIG. 7 is a side view of a further embodiment of a dispensing machine in accordance with the present invention where the barriers are bent.

In FIG. 7, there is shown a further embodiment of a vending machine in accordance with the present invention where the machine is designed to dispense larger containers than the machine described in FIG. 1. The machine of FIG. 7 is designed to dispense containers that have a volume of approximately two liters. The same reference numerals have been used in FIG. 7 to describe those components that are identical to the components of FIGS. 1 and 2 without further description unless otherwise indicated. It can be seen firstly that the rods 12 immediately adjacent to the paddles 20 are not offset from the other rods 12 in the vertical channel. It can also be seen that there are only two paddles 20, a lowermost paddle and an uppermost paddle. Since the containers are so large, the number of shelves is more limited and the number of containers in the vertical channel is more limited. It can also be seen that a barrier 46 located immediately adjacent to the uppermost paddle 20 is bent so that it has a V-shaped cross section.

Figure 8:
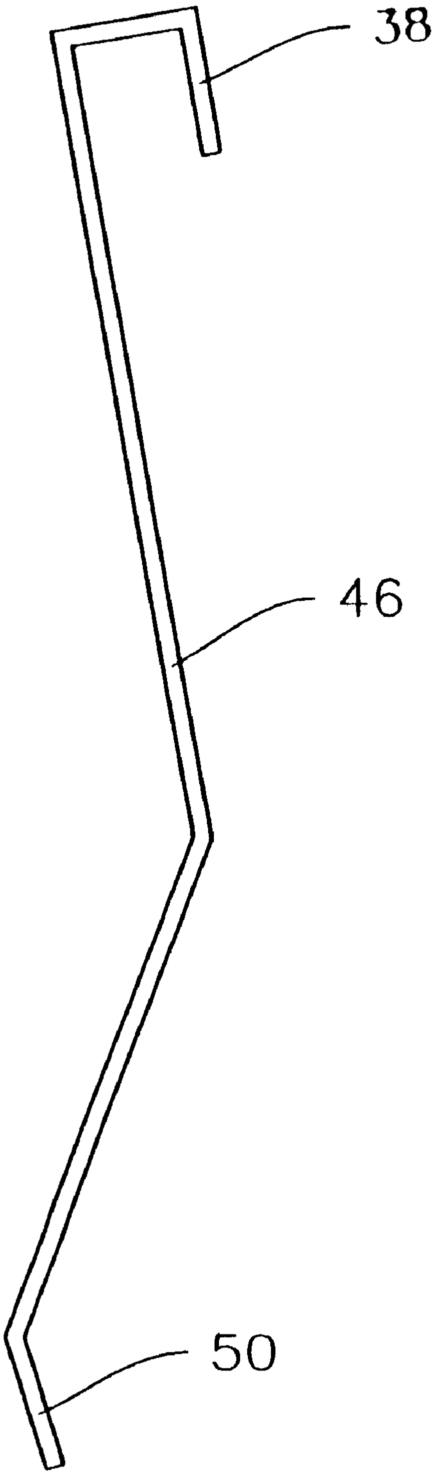
FIG. 8 is an end view of one of the barriers.

An end view of the barrier 46 is shown in an enlarged view in FIG. 8. It can be seen that the barrier has a U-shaped flange 38 at a top thereof with a V-shaped bend 48 in the central area and a lip 50 along a bottom edge.

In operation, the dispensing machine of FIG. 1 or FIG. 7 is filled or at least partially filled with containers having a rectangular shape. Preferably, the containers have a square cross section and still more preferably the containers are milk cartons. The vertical channel is preferably filled first and then the shelves are filled preferably commencing from the lowermost shelf to the uppermost shelf. When the machine is activated by activation means such as the insertion of a coin into a coin slot (not shown) the paddles rotate simultaneously by forty-five degrees in a clockwise direction. Each paddle has four sections 52. As the paddles rotate, all of the containers within the vertical channel move downward by one space and a container at the lowermost end of the uppermost shelf 14 falls off that shelf and opens the first gate at the end of the uppermost shelf. Simultaneously, the container that had been on the lowermost paddle 20 exits the vertical channel and slides along the ramp or chute to the outlet. When the activation means is activated a second time, the next container on the uppermost shelf enters the vertical channel and so on until the uppermost shelf is empty. Next, when there are no containers immediately opposite the first gate at the end of the second shelf from the top, the container at the lowermost end of the second shelf will enter the vertical channel. This process will continue each time the activation means is activated until the machine is empty with the machine emptying from top to bottom.

Since the machine will likely be refilled before it has emptied completely, those containers that are still within the machine will be rearranged into the vertical channel and placed on the uppermost shelves before the new containers containing the fresher product are placed in the machine. Thus, the existing containers will exit the machine before the new containers, which contain the fresher product.

In the three column machine shown in FIGS. 5 and 6, the machine operates in virtually an identical manner to the machine of FIG. 1 except that an additional controller must be placed in the activation means so that a user can select the set of shelves that will be activated in each case when the coin or coins are inserted. In other words, if the two percent milk is located on the center set of shelves, the consumer will choose the paddles on the center set of shelves to be activated in order to have a carton of two percent milk dispensed, from the machine. This is simply a matter of having the consumer depress a particular button or pad before inserting a coin or coins.

While the machines have been described for milk cartons, the machines could be used to dispense various products contained in rectangular or square containers. For example, apple juice or orange juice or other beverages could be contained in the same containers that are commonly described as milk cartons. Further, while the activation means has been described (but not shown) as a coin receptacle, the machine could be designed to receive and identify paper money in lieu of or in addition to coins.

We claim:

1. A dispensing machine for dispensing rectangularly shaped containers with flexible side walls, said machine comprising:

(a) a housing with an outlet for said containers, said housing containing a plurality of shelves that are sloped toward a vertical channel, said shelves being constructed so that said containers will slide laterally along said shelves on one side toward said channel;

(b) said channel extending from below a lowermost shelf past an uppermost shelf, said channel providing an exit passage for containers from said shelves to said outlet;

(c) said channel containing a plurality of paddles spaced vertically apart from one another, each paddle being capable of supporting a limited number of containers within said channel;

(d) said paddles being arranged to move simultaneously to lower one container, for each paddle, at a time from a space in said channel immediately above each paddle to a space in said channel immediately below each paddle;

(e) each shelf having a first gate located at a lower end thereof to control entry of containers from that shelf to said vertical channel, there being no shelf immediately opposite each paddle, each first gate having guide means on a side thereof facing said vertical channel, those gates of said first gates that are located immediately adjacent to said paddles being offset inward toward said shelves to provide greater width to said channel;

(f) barriers being located in said vertical channel, one barrier being located at each access area where a shelf has been omitted to prevent a container in said vertical channel from exiting said channel prematurely through said access area;

(g) with activation means, accessible from outside said housing, to cause said paddles to move simultaneously, thereby moving all containers within the channel downward one space at a time and moving a lowermost container to said outlet.

2. A dispensing machine as claimed in claim 1 wherein said barriers are second gates, said second gates having a shape similar to a shape of said first gates except that the said gates do not have guide means thereon.

3. A dispensing machine as claimed in claim 2 wherein the activation means is activated by a coin inserted in a coin slot.

4. A dispensing machine as claimed in claim 1 wherein said guide means is L-shaped and is a plate extending downward and inward into said vertical channel to assist in maintaining the alignment of the containers located within the vertical channel, said plate having a base that extends in a substantially horizontal direction away from said channel.

5. A dispensing machine as claimed in claim 4 wherein each paddle has a longitudinal axis and said containers have a longitudinal axis, said paddles being oriented within said channel to receive said containers so that the longitudinal axis of said paddles and the longitudinal axis of said containers is parallel to one another.

6. A dispensing machine as claimed in claim 4 wherein each paddle has four sections of approximately equal size.

7. A dispensing machine as claimed in claim 4 wherein the containers are milk cartons each paddle supports a number of cartons ranging from three to five cartons within said channel when said channel is filled with cartons.

8. A dispensing machine as claimed in any one of claims 1, 2 or 4 wherein there are a total of three vertical channels, each vertical channel having its own set of paddles and its own set of sloped shelves, said vertical channels all leading to said outlet, the set of paddles in each vertical channel being independently connected to said activation means so that a container can be dispensed from any one vertical channel at one time.

9. A dispensing machine as claimed in any one of claims 1, 2 or 4 wherein the containers are located transversely on said shelves so that said containers will slide towards said vertical channel by gravity.

10. A dispensing machine as claimed in claim 1 wherein said containers are milk cartons having a square cross section, said shelves having a slippery surface.

11. A dispensing machine as claimed in claim 10 wherein said slippery surface is Teflon coated.

12. A dispensing machine as claimed in claim 1 wherein each of the paddles has at least two substantially equal sections and said paddles rotate by a distance of one section about a longitudinal axis when said activation means is activated.

13. A dispensing machine as claimed in claim 12 wherein each of said paddles has at least three substantially equal sections.

14. A dispensing machine as claimed in claim 13 wherein said first gates have an open position and a closed position, each first gate remaining in a closed position when there are one or more containers in said channel located immediately adjacent to an outside of said first gate, each first gate opening when there are no containers immediately adjacent to an outside of said first gate but there are containers on a shelf located inside said first gate.

15. A dispensing machine as claimed in claim 14 wherein there are three paddles within said vertical channel, a lowermost paddle, an uppermost paddle and an intermediate paddle.

16. A dispensing machine as claimed in claim 15 wherein said paddles are spaced apart from one another so that each paddle supports four containers within said channel when said channel is filled with containers.

17. A dispensing machine as claimed in claim 16 wherein the intermediate paddle has sprockets at both ends thereof, the uppermost paddle has a sprocket at one end thereof and the lowermost paddle has a sprocket at an opposite end thereof, a first chain connecting the sprockets of said lowermost paddle and said intermediate paddle and a second chain connecting the sprockets of said intermediate paddle and said uppermost paddle, one of said paddles being connected to drive means so that said paddles can rotate simultaneously.

18. A dispensing machine for dispensing rectangularly shaped containers with flexible side walls, said machine comprising:

(a) a housing with an outlet for said containers, said housing containing a plurality of shelves that are sloped toward a vertical channel, said shelves being constructed so that said containers will slide along said shelves on one side toward said channel;

(b) said channel extending from below a lowermost shelf past an uppermost shelf, said channel providing an exit passage for containers from said shelves to said outlet;

(c) said channel containing a plurality of paddles spaced vertically apart from one another, each paddle being capable of supporting a limited number of containers within said channel;

(d) said paddles being arranged to move simultaneously to lower one container, for each paddle, at a time from a space in said channel immediately above each paddle to a space in said channel immediately below each paddle;

(e) each shelf having a first gate located at a lower end thereof to control entry of containers from that shelf to said vertical channel, there being no shelf immediately opposite each paddle, each first gate having L-shaped guide means on a side thereof facing said vertical channel;

(f) barriers being located in said vertical channel, one barrier being located at each access area where a shelf has been omitted to prevent a container in said vertical channel from exiting said channel prematurely through said access area, each barrier being bent inward giving each barrier a V-shaped cross section to provide greater room in said vertical channel for said cartons to move past each paddle;

(g) with activation means accessible from outside said housing, to cause said paddles to move simultaneously, thereby moving all containers within the channel downward one space at a time and moving a lowermost container to said outlet.

19. A dispensing machine as claimed in claim 18 wherein said barriers are second gates, said second gates not having guide means thereon.

20. A dispensing machine as claimed in claim 19 wherein said guide means is L-shaped to force containers in said channel away from said shelves.

21. A dispensing machine for dispensing containers with flexible side walls, said machine comprising:

(a) a housing with an outlet for said containers, said housing containing two sets of shelves, each set of shelves having a corresponding vertical channel, the shelves of each set being sloped toward said corresponding vertical channel, said shelves being constructed so that said containers will move along said shelves toward said corresponding vertical channel;

(b) said channel for each set of shelves extending from below a lowermost shelf past an uppermost shelf, said channel providing an exit passage for containers from shelves of one set to said outlet;

(c) each corresponding channel containing a plurality of paddles spaced vertically apart from one another, each paddle being capable of supporting a limited number of containers within said corresponding channel;

(d) said paddles in each vertical channel being arranged to move simultaneously to lower one container, for each paddle, at a time from a space in said channel immediately above each paddle to a space in said channel immediately below each paddle, the paddles in each vertical channel moving independently of the paddles in any other vertical channel;

(e) each shelf having a first gate located at a lower end thereof to control entry of containers from that shelf to said corresponding vertical channel, there being no shelf immediately opposite each paddle, each first gate having guide means on a side thereof facing said vertical channel;

(f) barriers being located in each corresponding vertical channel, one barrier being located at each access area where a shelf has been omitted to prevent a container in said vertical channel from exiting said channel prematurely through said access area;

(g) with a controller and activation means accessible from outside said housing to allow the paddles in each vertical channel to be activated independently of paddles in any other vertical channel, thereby moving all containers within that vertical channel that is activated downward one space at a time and moving a lowermost container in said vertical channel that is activated to said outlet.

22. A dispensing machine as claimed in claim 21 wherein there are at least three sets of shelves with each set having a corresponding vertical channel.

* * * * *